US006379828B1

(12) United States Patent
Worth

(10) Patent No.: US 6,379,828 B1
(45) Date of Patent: Apr. 30, 2002

(54) FUEL CELL

(75) Inventor: Brian Worth, Cardana Besozzo (IT)

(73) Assignee: European Community represented by the Commission of the European Communities, Rue Alcide de Gasperi (LU)

(*) Notice: Subject to any disclaimer, the term of this patent is extended or adjusted under 35 U.S.C. 154(b) by 0 days.

(21) Appl. No.: 09/558,230

(22) Filed: Apr. 26, 2000

(51) Int. Cl.[7] ................................................ H01M 8/04
(52) U.S. Cl. ............................ 429/14; 429/15; 429/34; 429/13
(58) Field of Search .......................... 429/14, 17, 34, 429/67, 68, 69, 70, 50, 51

(56) References Cited

U.S. PATENT DOCUMENTS

| | | |
|---|---|---|
| 3,532,548 A | 10/1970 | Stachurski |
| 4,092,463 A | 5/1978 | Wurmb et al. |
| 4,147,839 A | 4/1979 | Solomon |
| 4,521,497 A | 6/1985 | Tamminen |
| 4,684,585 A | 8/1987 | Tamminen |
| 4,770,753 A | 9/1988 | Ramshaw |
| 5,830,593 A | * 11/1998 | Nielson .................... 429/38 |
| 6,162,555 A | * 12/2000 | Gutierrez et al. .......... 429/15 |

FOREIGN PATENT DOCUMENTS

| | | | |
|---|---|---|---|
| DE | 27 06 310 A | 8/1978 | |
| EP | 0 183 470 A | 6/1986 | |
| EP | 0 207 522 A | 1/1987 | |
| FR | 1 541 349 A | 10/1968 | |
| WO | WO-00/49205 | * 8/2000 | ............. C25B/1/04 |

OTHER PUBLICATIONS

Database WPI, Section El, Week 9510, Derwent Publications Ltd., London, GB; XP002092119 (Abstract), Aug. 1993.

* cited by examiner

Primary Examiner—Stephen Kalafut
Assistant Examiner—R. Alejandro
(74) Attorney, Agent, or Firm—Bacon & Thomas

(57) ABSTRACT

The present invention is concerned with a fuel cell comprising: a chamber suitable for holding an electrolyte therein; a mechanism which enables rotation of the electrolyte about an axis of rotation of the chamber; one or more structures which define one or more inlets for introducing an oxidant and/or a fuel into the chamber, which one or more inlets are spaced from the axis of rotation of the chamber; at least one electrode contactable with the electrolyte and the oxidant and at least one electrode contactable with the electrolyte and the fuel. It also provides a method for improving the efficiency and performance of fuel cells.

32 Claims, 2 Drawing Sheets

Section X-X

Section Y-Y

FUEL CELL

The present invention is concerned with a fuel cell and in particular with a fuel cell which provides increased operating efficiency by maximising the available interfacial area between high and low density fluid phases or between gas-liquid-solid phases, across which phases heat and mass transfer and chemical reactions may take place. The present invention also provides for a novel method of improving the efficiency and performance of fuel cells by subjecting them to forced rotation.

Fuel cells are devices for utilizing the electrochemical conversion of the free-energy changes of a chemical reaction directly into electrical energy. By making use of gaseous or solid reactants (e.g. hydrogen, oxygen, or metallic powders) the anodic and cathodic reactants can be fed into their respective chambers where the electrochemical energy conversion proceeds. An electrolyte layer (often a liquid) is provided between the two electrodes of an electrochemical cell. At the anode, the half-cell reaction involving the anodic reagent yields electrons which are transported through an external circuit to the cathode where they are taken up in the half-cell reaction involving the cathodic reactant, usually oxygen. The circuit is completed by the transport of ions from one electrode to the other through the electrolyte, Current passing through the external electrical circuit provides electrical power and allows mechanical work to be done via, for example, an electric motor.

Unlike batteries which store electrical energy, fuel cells are energy producers which convert the energy of chemical reactions directly into electricity. They do so in an environmentally clean way, with no harmful pollutants such as those which arise from the normal burning of fuels in conventional combustion processes. Because fuel cells are not limited to the thermodynamic (Carnot) efficiencies of internal combustion engines (typically 40–50%), they offer much greater prospects for achieving high efficiencies (70–100%) and energy conversion rates. In order to attain these high efficiencies, however, new designs of compact fuel cells are required which can extract the electrochemical energy in a more effective manner. Achievable power output and performance is limited by the slow diffusion of ions and electrons at the reactant-electrolyte-electrode interface, especially in the case where the reactant is a gas.

Fuel cells are often classified according to their basic system configuration. The most common classifications include: phosphoric acid fuel cells (PAFCs); molten carbonate fuel cells (MCFCs); solid oxide fuel cells (SOFCs); proton exchange membrane fuel cells (PEMFCs); alkaline fuel cells (AFCs); and direct methanol fuel cells (DMFCs). In another classification, fuel cell types are grouped according to the fuel and oxidant consumed, e.g. hydrogen-oxygen (or air) fuel cells; organic compounds-oxygen (or air) fuel cells; carbon or carbon monoxide-oxygen (or air) fuel cells; nitrogenous compounds-oxygen (or air) fuel cells; and metal-oxygen (or air) fuel cells. Conventional fuel cells are typically composite quasi-static structures incorporating numerous individual electrochemical cells stacked in series and parallel to generate the required output voltage and current density. The present invention is particularly suited to the metal-oxygen type of fuel cell, and also the hydrogen-oxygen type of fuel cell, but is not exclusively limited to them.

One objective of the present invention is therefore to provide a fuel cell with increased working efficiency which alleviates to some extent problems associated with previously used fuel cells.

Accordingly, the present invention provides for a fuel cell comprising:
- a chamber suitable for holding an electrolyte therein;
- a mechanism which enables rotation of the electrolyte about an axis of rotation of the chamber;
- one or more structures which define one or more inlets for introducing an oxidant and/or a fuel into the chamber, which one or more inlets are spaced from the axis of rotation of the chamber;
- at least one electrode contactable with the electrolyte and the oxidant; and
- at least one electrode contactable with the electrolyte and the fuel;

Fuel cells currently known in the art frequently employ a liquid electrolyte and a gaseous oxidant (e.g. air or oxygen) and/or fuel (e.g. hydrogen). The circulation of the gaseous oxidant and/or fuel through the electrolyte relies upon buoyancy-driven natural convection processes. In all buoyancy-driven natural convection processes on earth, the driving forces arise through the interaction of matter with the earth's gravitational field. The 'rise velocity', i.e. the natural velocity attained by the lighter phase, such as a bubble of gas, with respect to the heavier phase, usually a liquid, is therefore governed by the value of the local gravitational acceleration, which on earth is roughly constant at 9.81 m/s$^2$. This rise velocity can be increased substantially by intensifying the local acceleration field using rotating frames such as centrifuges or other spinning devices.

In the fuel cell of the present invention, centrifugal forces acting on the electrolyte phase, together with inverse-centrifugal (centripetal) forces acting on the oxidant and/or fuel phases, act jointly to increase the overall circulation flow rate. When the induced inertial acceleration exceeds that of the normal local gravitational field, this externally-forced flow process may promote an increase in volumetric throughput of chemical substances in a reactor and hence improve the overall rate of chemical reaction. In ordinary 'static' fuel cells, the overall rate of chemical reaction and therefore the overall power density achievable from the device may be limited by the local gravitational field. In the fuel cell of the present invention the improved overall rate of chemical reaction will increase the power density achievable from the device.

Advantageously, the acceleration field induced in the fuel cell of the present invention as a result of rotation of the electrolyte about an axis of rotation of the chamber and the improved convection which results can also promote and enhance the internal circulation of the electrolyte fluid without the use of pumps. Under strong rotation, when the angular velocity is sufficiently high to induce a local linear acceleration substantially greater than the normal local gravitational field (approximately 9.81 m/s$^2$), this flow process is referred to as 'enhanced natural circulation'. The present invention thus advantageously utilises enhanced natural circulation to provide an increase in the power output of fuel cells, such as for example metal-oxygen (or air) fuel cells.

The increase in the bubble rise velocity also brings with it concomitant increases in the throughput of chemical substances which can substantially improve the yield from an electrochemical reaction process. This is particularly advantageous because, generally, the performance of conventional electrochemical reactors is limited by the maximum achievable flow rate of oxidant and/or fuel, which are usually gases, passing through a porous electrode in an electrolyte (usually a liquid), and the available interfacial area between the different phases across which heat and mass transfer and electrochemical reactions take place.

It will be appreciated by those skilled in the art that the rotation of the electrolyte about an axis of symmetry of said chamber may be achieved in a number of ways. However, preferably, the mechanism which enables rotation of said electrolyte comprises a mechanism which enables rotation of said chamber. Obviously, rotating the chamber containing the electrolyte automatically rotates the electrolyte itself. This may, for example, be achieved by means of an electric motor. Thus, the reactor may, in one embodiment, comprise a centrifuge or the like.

The chamber may, in another embodiment, be rotated by providing a plurality of guide vanes and/or impellers thereon, which cause said chamber to rotate upon introduction of the oxidant and/or fuel into the fuel cell. In this embodiment of the invention, the impellers/guide vanes may be provided outside said chamber, which itself may be provided inside an external housing. Thus, advantageously, introduction of the oxidant and/or fuel into the external housing imparts movement to the chamber by impinging on said guide vanes prior to its introduction into the chamber for reaction. Thus, an external rotation mechanism, such as an electric motor or the like, may not be required, the rotation being induced primarily by the pressure and momentum change of the introduced oxidant and/or fuel impinging on said guide vanes to impart movement to the chamber.

Alternatively, the mechanism which enables rotation of the electrolyte may comprise rotating impellers or baffles or the like provided within said chamber.

When the electrolyte is rotated about an axis of rotation of the chamber, centrifugal and Coriolis forces serve to increase the buoyancy forces on the oxidant and/or fuel entering the fuel cell through the inlet for introducing oxidant and/or fuel into said chamber. The fuel cell thus works on an 'inverse centrifuge' type principle. The 'inverse centrifuge' principle provides the action by which a continuous flow of a lower density fluid through another higher density fluid can be maintained, the induced buoyancy forces being caused by centripetal forces acting on the lighter phase.

Fuel cells which rely on a continuous recirculation of liquid electrolyte could benefit from the 'inverse centrifuge' effect. For example a gas, which ray constitute either the fuel and/or the oxidant, introduced. Into the electrolyte will reduce the local fluid density and this density reduction can be used to drive a continuous 'enhanced natural circulation' around the fuel cell. This circulating flow is increased in direct proportion to the increase in acceleration field resulting from an increase in angular velocity or spin speed of the electrolyte about the axis of rotation. Further, the 'bubbling action' of the gas can substantially increase the electrochemical reaction rate by increasing the gas-liquid-solid interfacial area at the reaction sites. The fuel and/or oxidant gases may be supplied under pressure through the one or more inlets located away from the axis of rotation. Preferably, the one or more inlets are provided in the peripheral walls of said chamber which are furthest from the axis of rotation. The rates of heat and mass transfer are also increased. Rotation therefore serves to promote and increase the continuous natural circulation of the electrolyte and to promote and increase the throughput of oxidant and/or fuel in a fuel cell in a manner analogous to the flow in a centrifugal bubble column or disk, without the use of pumps. The exploitation of 'enhanced natural circulation' by the fuel cell of the present invention reduces the need for external pumps, piping or other components which are ordinarily required for the circulation of the electrolyte within the fuel cell. This results in a more compact and cost-effective design with substantially fewer moving parts, thus increasing overall reliability. The enhanced throughput of oxidant and/or fuel also enables the use of higher flow resistance (and hence denser) electrodes, in turn contributing to a higher energy yield. As well as enhancing ionic transport between the electrodes the enhanced natural circulation of the electrolyte also reduces the dendritic growth of species such as metal oxide crystals which can be responsible for short circuiting fuel cell devices.

Another advantage of the fuel cell of the present invention is the controllability of its power output. This may be achieved by variation of the spin speed of the electrolyte. Increasing the spin speed increases the throughput of reactants thus increasing the rate of reaction. This improves the uniformity of power generation.

The incorporation of a spin-axis is also a useful engineering feature. Having a single common axis of rotation, a fully integrated 'stand alone' power unit can be designed having the fuel cell reaction chamber, oxidant and/or fuel delivery system, exhaust discharge systems, electric drive motor and spin-speed regulator all on one shaft. Direct coupling to an inertial flywheel or drive/transmission system is also possible. For applications in space where earth-derived gravitational forces are practically absent, the creation of artificial gravity by spinning centrifuges may be the only means of achieving induced natural convection flow processes.

Optionally, the fuel cell may also provide at least one structure defining at least one outlet for removal of said oxidant and/or said fuel adjacent said axis of rotation.

Preferably, when one or more outlets are present, the inlet(s) and outlet(s) are located at opposite ends of the chamber. This advantageously provides the maximum interfacial area between the electrodes and the oxidant and/or fuel for electrochemical reactions to occur.

Preferably, introduction of the oxidant and/or fuel into the chamber and subsequently into contact with said electrolyte and said electrodes may be by way of sparging means. This, advantageously, provides a plurality of inlets which deliver the oxidant and/or fuel and optimises the reactive surface area in the chamber. Advantageously, when a gas is used as the oxidant and/or fuel, the sparging means delivers bubbles of a uniform size.

Preferably, the fuel cell also comprises one or more compressors which pressurise the oxidant and/or fuel prior to introduction into the fuel cell via the one or more inlets for the oxidant and/or fuel. Preferably the compressor is driven using energy supplied by the fuel cell Preferably, the fuel cell also comprises one or more low-pressure turbines which de-pressurise any oxidant and/or fuel leaving the fuel cell via the one or more outlets for the oxidant and/or fuel. The recovered energy can be redirected back to other components of the fuel cell such as the compressor or the mechanism which enables rotation of the electrolyte. This improves the energy efficiency of the device.

Preferably the fuel cell also comprises a feedback mechanism which regulates the flow of oxidant and/or fuel through the fuel cell so as to minimise any undesirable vibrations which may occur due to nonuniform distribution of oxidant and/or fuel.

Preferably, the electrodes comprise porous electrically conductive material. Preferably, the electrodes comprise three-dimensional blocks rather than two-dimensional plates. In a metal-oxygen (or air) fuel cell, the metal fuel is itself the electrode which contacts the oxidant. That is to say, the metal acts both as oxidant and electrode. The meal fuel may be fabricated in the form of a solid porous block or supplied as a loosely compacted metal powder retained within a porous metal cage watch cage acts as an electrical contact as well as providing structural support. The electrode which contacts the oxidant preferably comprises a porous electrically-conducting solid material such as porous sodium-tungsten-bronze or a porous carbon material such as pyrolized porphyrins.

A fuel cell wherein the fuel is a metal and the oxidant is oxygen or air represents a preferred embodiment of the present inventions. In this case, the metal fuel may be provided in the form of a powder for continuous feeding or as a single 'charge' of compacted porous metal. The electropositive metals most suitable for metal-oxygen fuel cells include, in order of decreasing electrochemical energy equivalent: lithium, aluminium, magnesium, calcium, iron and zinc. Aluminium is second only to lithium in terms of gravimetric energy density but is superior on volumetric grounds and is also cheaper and less toxic. Thus aluminium is preferred as the metal fuel.

When the fuel used is a metal the chamber advantageously additionally comprises a porous cage for containing said metal. In this type of fuel cell, the electrolyte preferably comprises hydroxide ions, more preferably, said electrolyte comprises an aqueous solution of potassium or sodium hydroxide.

In a particularly preferred embodiment of the present invention the chamber additionally comprises internal baffles which separate the oxidant electrode and the fuel electrode and which define passageways for the internal recirculation of the electrolyte.

Even more preferably the chamber may additionally comprise a trap for the collection and/or removal of reaction products from the cell. For a fuel cell wherein the fuel is a metal and the oxidant is oxygen or air, the trap may comprise a chemical precipitate trap (such as calcium oxide) which retains the reaction by-product (such as metal hydroxide).

In a preferred embodiment of the present invention the chamber may be subdivided into smaller chambers to create a plurality of electrochemical cells spaced around the circumference of the chamber which may be electrically connected to each other in series or in parallel Preferably, the speed of rotation of the electrolyte may be variable. That is to say, the mechanism which enables rotation of the electrolyte may provide for rotation at variable speed. More preferably, the rotation may driven by an external mechanism such as an electric motor which may be integral with the fuel cell. The electric motor which drives rotation may be powered by electricity generated by the fuel cell itself. A particularly preferred embodiment is a 'self-starting' cell wherein the fuel cell remains operative even when it is not spinning so that it may provide sufficient electrical power to start-up the electric motor.

Preferably, the electrolyte may be rotated with its spin axis oriented in the vertical direction.

In a further aspect of the invention there may also be provided a fuel cell system comprising a plurality of fuel cells according to the present invention which fuel cells are physically connected in series with one another and electrically connected in series or in parallel with one another. The electrical connections allow the electrical characteristics of the system to be varied. In a preferred embodiment of the fuel cell system the fuel cells are all mounted on a common spin axis.

The present invention also encompasses within its scope a vehicle comprising a fuel cell or a fuel system as herein described.

According to a further aspect of the present invention there is provided a method for improving the efficiency and performance of fuel cells which method comprises introducing an oxidant and/or fuel into contact with an electrolyte present in a fuel cell as defined herein by means of the one or more inlets spaced from the axis of rotation of said chamber and rotating the electrolyte about the axis of rotation of said chamber. Any unreacted oxidant and/or unreacted fuel may be optionally removed by means of one or more outlets adjacent said axis of rotation.

Preferably, the electrolyte in said chamber is rotated by rotating said chamber. The chamber may be rotated by external means (e.g. an electric motor) or alternatively by providing guide vanes or baffles on said chamber which cause said chamber to rotate upon introduction of said oxidant and/or fuel into said fuel cell.

The method of the present invention may further comprise allowing solvent (usually water) to boil off from the electrolyte. This is advantageous because it helps to maintain the correct electrolyte concentrations and pH within the fuel cell. It also helps to dissipate internal heat generation caused by ohmic resistance and $I^2R$ losses.

The method of the present invention may further comprise the step of regenerating the parent chemical fuel and oxidant from the reaction by-products.

Apart from the usual benefits claimed for all fuel cells, such as clean electrochemical 'combustion' with no harmful emissions to the atmosphere, the additional advantages claimed of this invention are basically threefold. (i) The centrifuge action serves to increase the operating pressure within the fuel cell without increasing the temperature. The reasons why the electrical output is thereby increased may be attributable to the increase in interfacial contact area between the oxidant and/or fuel and electrolyte at the reaction site within the pores of the electrode, directly influencing the ion exchange process. (ii) Intensification of the acceleration field induced by rotation can be used to increase the throughput of fuel and/or oxidant by the inward centripetal force acting on the low density phase (i.e. the oxidant and/or fuel), and the outward centrifugal force acting on the high density phase (i.e. the electrolyte), thereby increasing the oxidant and/or fuel diffusion rate and hence the overall reaction rate and power output. (iii) The rotation can be readily sustained by a small electric motor deriving energy from the fuel cell itself and mounted on the common spin axis. Excess electrical power or rotational kinetic energy could then be utilized for mechanical traction in automotive applications by direct drive electric motors, possibly incorporating energy storage techniques (e.g. flywheels or batteries).

In a typical hydrogen-oxygen fuel cell, gaseous fuel and oxidant are pumped separately under pressure through porcus electrodes in contact with an electrolyte. Pressurisation permits them to operate in zero-gravity conditions as well as on earth. However, a rotating fuel cell offers advantages not achievable in a solely static pressurised system. These benefits derive not only from the accompanying increase in pressure. Through the 'inverse-centrifuge' effect, the increased buoyancy forces dynamically stimulate the process of oxidant/electrolyte and/or fuel/electrolyte mixing and diffusion, thereby enhancing the chemical reaction process. Increasing the local acceleration field (by rotation) has a very strong influence on buoyancy, on the dynamics of bubble motion and the bubble 'rise velocity'. A rotating fuel cell can therefore take advantage of dynamic effects not present in conventional static pressurised fuel cells.

As previously mentioned, a particularly preferred embodiment of the invention comprises a fuel cell for 'burning' metallic fuel (e.g. powdered aluminium or zinc) comprising porous matrix 'oxygen' electrodes within a liquid electrolyte. Such a fuel cell can also benefit substantially from centrifugal effects when constructed as a rotating fuel cell. The additional advantages over conventional static metal-oxygen fuel cell designs are as follows. (i) The oxidizing gas (oxygen or air) injected into the porous matrix oxygen electrode, by virtue of the intense 'bubbling action', can significantly increase the reaction rate by creating a pulsating gas-liquid film at the 'three-phase boundary' within the oxygen electrode. Rapid random movements of this localized wetted film region promotes a significant increase in charge transfer at the gas-liquid-solid interface. (ii) The rising gas stream reduces the average fluid density in the electrolyte surrounding the oxygen electrode, which, together with the increased centrifugal force due to rotation of the liquid in the fuel chamber, promotes enhanced natural circulation of electrolyte around the cell. (iii) Oxygen or air not consumed in the reduction process is readily discharged from the fuel cell by means of improved gas-liquid separation at the electrolyte free surface assisted by the rotational centrifuge effects. (iv) Reactant by-products can be effectively 'trapped' away from the axis of rotation by centrifugal forces without impeding the flow of electrolyte around the cell. These chemical by-products can either be continuously (or intermittently) removed, or, in a closed loop system, regenerated to yield the parent metal fuel plus oxygen for subsequent re-use. (v) Centrifugal forces can be utilized to an advantage as a means of feeding the cell with fresh metallic fuel. These 'outward' centrifugal forces can be used to distribute and compact the powdered fuel, simplifying the design of the fuel supply system. (vi) A 'fluidized bed' of fuel particles can be maintained to yield a large increase in interfacial area between the fuel and electrolyte. This improves overall fuel cell performance and efficiency by augmenting the electrochemical reaction rate. (vii) Powdered aluminium is particularly preferred because it is readily obtainable in a very pure condition at low cost. Being strongly electropositive, it therefore provides a suitably cheap fuel which can be electrochemically 'burned' without the release of noxious gases. The system is also chemically regenerative with a low cost of regeneration. (viii) The compactness of the metal fuel together with the low temperature of operation result in fewer material problems, higher reliability and longer life for the cell. A spinning configuration also provides for a smaller overall design, hence reduced mass and increased power-to-weight ratio.

Depending on the specific type, a rotating fuel cell could be engineered in many different ways especially with regard to te geometry of the gas and liquid flow paths, electrode configuration, design of electrolyte chambers and the mechanical/electrical connections between individual cells. One feature which will generally he common to rotating fuel cells however is that the injected oxidant and/or fuel are introduced at those regions corresponding to substantially the outer-most radius of the particular electrochemical cell. Thus, the typical back-to-back arrangement of electrodes in conventional fuel cells should instead be redesigned to facilitate the centrifuge-enhanced diffusion of gases through the electrolyte-wetted regions of the electrodes. For any given cell, the two electrodes could for example be opened out edge-to-edge fashion, preferably, but not necessarily, on a plane of constant radius.

One possible back-to-back configuration for a fuel cell utilising spin-enhanced natural circulation would be to spatially separate the 'fuel electrode' from the 'oxidant electrode' by a common radial channel or conduit in such a way as to permit a double-loop recirculation of the electrolyte. Gaseous fuel such as hydrogen may be injected by means of a sparger into the outer Periphery of the fuel electrode Likewise, gaseous oxidant such as air may be injected separately into the outer periphery of the oxidant electrode. Liquid electrolyte could then circulate freely by flowing radially outwards in the common central channel from where it would divide to flow into the two sparger regions of the fuel and oxidant inlets. The radial inward flow of gases, and the resulting reduction in two-phase mixture densities in the separated fuel and oxidant sections will promote enhanced circulation of liquid electrolyte around the fuel cell. Further requirements to balance gas and electrolyte pressures in order to control the position of the wetted interface within the electrodes may be achieved by pressure regulation or through control of rotational spin speed.

Electrode design in metal-oxygen fuel cells is somewhat less complex and, therefore, allows better use of the inverse-centrifuge principle to control the gas and liquid flows through the porous structures of the two electrodes.

In some fuel cell designs, the electrolyte, which may be an acid or alkaline aqueous solution, continuously circulates between the electrodes. As stated already, in a rotating fuel cell, centrifugal forces causes a large increase in hydrostatic pressure in the electrolyte which, up to a limit, is beneficial to fuel cell operation and performance. By injecting gas (fuel or oxidant) under pressure through small nozzles at the outer periphery of the centrifuge chamber, a drastic reduction in density of the gas-liquid mixture is produced which promotes enhanced natural circulation of the liquid electrolyte around the cell. The pressure and circulation flow rate can both be directly augmented by simply increasing the rotation speed.

The advantages of rotation outweigh the additional complexity of driving the rotation by, for example, an electric motor. Useful advantages arise from the coupling of the hydrodynamic and electrochemical processes which together increase the overall efficiency and specific power output from such a device. Rotation can be used to set up and control an enhanced convection-type flow of the gas-liquid two-phase mixture forming the recirculating electrolyte. This avoids the need for pumps to force the liquid around the fuel cell circuit, thus eliminating ancillary control circuits and reducing material corrosion problems. Further, the pressure within the fuel cell can be increased to optimize the electrochemical reaction rates at the electrode surfaces by controlling spin speed By injecting gas (e.g. hydrogen, oxygen or air) directly into the electrode, the resultant 'bubbling' action brings about localized random movements of the electrolyte film at the gas-liquid-solid interface which increases the electrochemical reaction rate. This is known to greatly improve the exchange of electronic and ionic charge at the 'three-phase boundary' and can produce a 100-fold increase in current density at the electrode. A very large increase in interfacial area between a solid fuel (e.g. powdered aluminium) and the liquid electrolyte can advantageously be sustained by 'fluidizing' the solid particles. Producing a 'fluidized bed' makes the metallic fuel particles dynamically buoyant, increasing the interfacial contact area and thus the electrical power density obtainable from a given quantity of fuel.

Further advantages of a rotating fuel cell stem from the typically intermittent nature of power sources needed for domestic transportation purposes. For these applications, the means of rotation may be derived via the main transmission system whilst consuming only a small fraction of the total power produced. The additional power required for maintaining this rotation is low compared to the overall power needed for vehicle acceleration. This additional power will be used mainly to overcome frictional resistance in bearings and to compress the oxidant gas (e.g. air) for pressurised operation. Such a drive mechanism could be geared into the main transmission system for road vehicles and coupled to total power demand. In this way, fuel cell spin rate could be geared to road speed, possibly utilizing a flywheel effect to manage and control spin velocity and thereby generate higher specific power on demand for an increase in acceleration.

The invention may be more clearly understood from the following description, which is given by way of example only, with reference to the accompanying drawings wherein.

Figure 1:
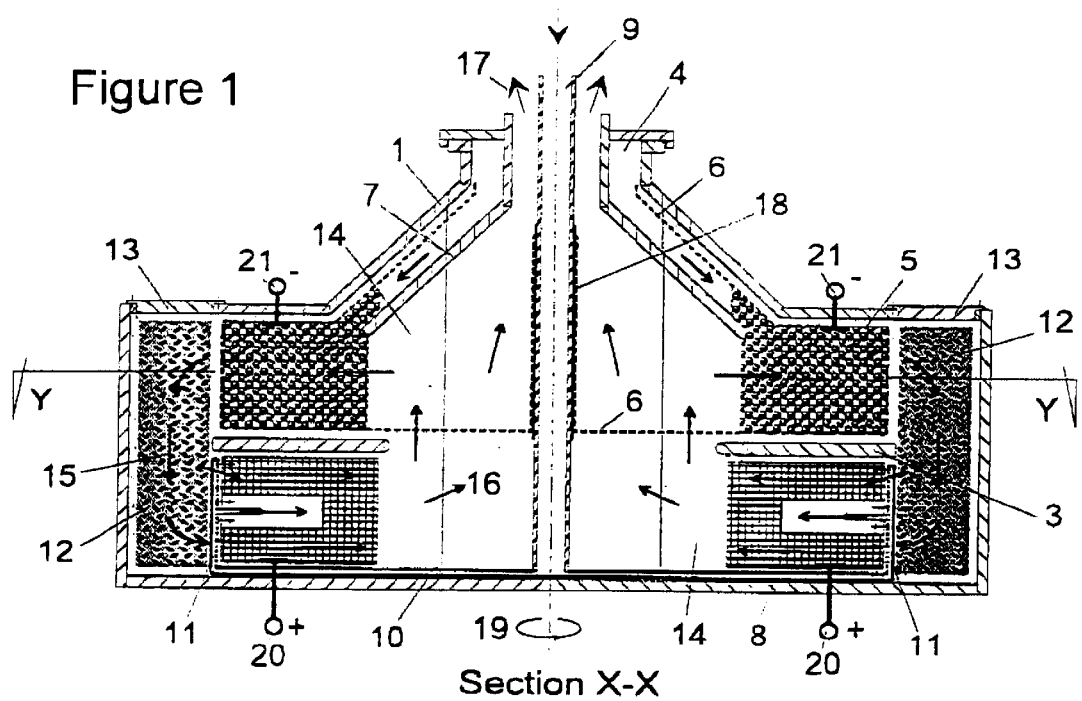
FIG. 1 is an embodiment of the basic concept as applied to rotating metal-oxygen fuel cells. A vertical cross section through such a rotating fuel cell is indicated in section X—X and a horizontal section near the mid-plane in section Y—Y.
Figure 1:
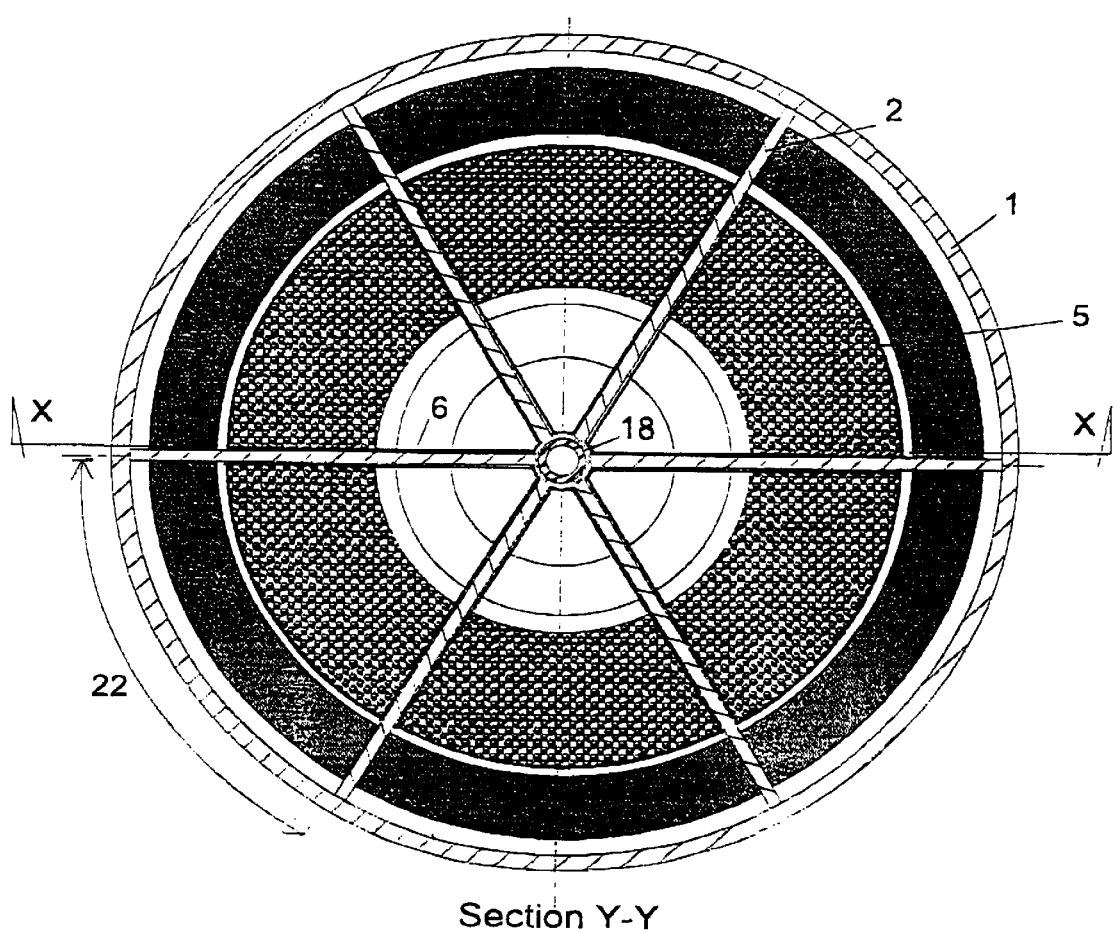

With reference to FIG. 1, the main components for a metal-oxygen rotating fuel cell are as follows. A chamber comprising a cylindrical non-conducting chamber (1) capable of sustaining large circumferential hoop stresses from centrifugal forces caused by rotation about an axis of symmetry (19). The main chamber (1) is separated into one or more cells by non-conducting radial dividing plates or walls (2) to electrically isolate individual electrochemical cells, thus permitting 'stacking' of multiple series-connected cells to increase overall output voltage. Internal plate-type baffles (3) separate the upper and lower halves of each cell and provide passageways for internal recirculation of the electrolyte (14) as well as structural support for the electrodes (5 and 8). The radial plates (2) and baffles (3) also give structural strength to the chamber under high spin-induced stresses as well as providing support for the two electrodes (5 and 8). Liquid electrolyte (14) however can flow freely and continuously between all cells in the chamber without additional pumping.

Fuel, such as powdered aluminium, magnesium or zinc, is introduced via a fuel supply inlet (4) into the cells, and contained within a porous gauze-like material in the form of a cage (6). The main purpose of this cage is to retain the powdered fuel as well as to provide an electrical contact (21) for power take-off. This powdered fuel is fed directly into the fuel cage by means of an internal conical channel (7) which is configured to allow a continuous supply of fuel to the cell as necessary Once introduced into the cell the metal fuel also becomes a constituent of the electrode (5). The oxygen electrode (8) is fabricated from a solid porous conducting matrix such as porous sodium-tungsten bronze or porous carbon to complete the electrochemical circuit of the fuel cell. Air or oxygen, introduced under pressure via a central gas supply tube (9), then flows into contact with the various oxygen electrodes in each call via a series of radial channels (10) and fine nozzles or 'spargers' (11). Pressurized air is supplied either via a compressed air cylinder or by means of an on-board air compressor (see FIG. 2). This gas, introduced at the 'bottom' of the electrode (8), serves two functions. Firstly, it supplies air or oxygen directly to the oxygen electrode (8) and promotes 'bubbling' at the three-phase boundary of the electrode surface. Secondly, gas bubbles injected into the electrolyte (14) rise 'up' towards the spin axis (19), reducing the fluid density in the 'riser' part of the cell and creating a natural circulation 'upwards' through the oxygen electrode (8) and 'downwards' through the fuel electrode (5).

After electrochemical reaction within the fuel cell, the reaction products are retained in a trap (12) such as a matrix of lime or similar substance, allowing removal of reaction products from the cell via removable access plates (13) or via an external reaction product removal system (not shown). A closed-loop regeneration system could also preferentially be used to decompose the reaction products electrolytically back to the parent metal and oxygen. Such a regenerative system would permit autonomous operation in oxygen-deficient environments such as in space or under water.

As a result of rotation, the electrolyte (14) will form a free surface near the axis of rotation. Centrifugal and centripetal forces will maintain the continuous natural circulation flow path (15) of electrolyte around the cell, whilst permitting separation (16) of unreacted gas from the liquid free surface. The separated gaseous waste products may in this way be removed via an outlet (17) for disposal or re-use. Electrical insulation (18) is provided between the oxidising gas supply pipe (9) and the metal powder retaining cage (6) of the fuel compartment. Rotation about the spin axis (19) of the fuel cell chamber can be controlled to vary the rate of electrical power generation. Electrical connections (20) to the oxygen electrode and (21) to the fuel electrode allow connection to an external electrical circuit. Individual cell segments (22) within the centrifuge chamber can be coupled in series internally or externally to increase overall cell output voltage. Multiple units can be stacked in parallel and/or series configurations to match the desired overall power characteristics of the fuel cell stack to any particular application.

Operation of the metal-air fuel cell takes place as follows when aluminium is used as the fuel.

Using an alkaline electrolyte, the aluminium-air fuel cell operates according to two possible reaction schemes.

1) For alkali concentrations below 3M,

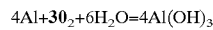

with the anode reaction

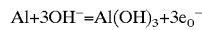

2) For alkali concentrations greater than 3M,

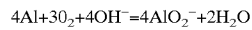

with the anode reaction

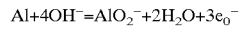

Start-up from stationary conditions may take place as follows. In the non-rotating state, electrolyte (14) is introduced into the centrifuge chamber (1) oriented with its spin axis (19) vertical so as to cover the oxygen electrode (8) and partially wet the cage (6) for holding the metallic fuel. Loose powdered fuel (e.g. aluminum or zinc) is introduced into the fuel cage (6), or alternatively a number of pre-formed porous fuel 'blocks' are placed in each fuel cell segment. In this embodiment there would be sufficient 'coverage' of the fuel with liquid electrolyte to generate enough power to initiate self-rotation and self-compression of the air supply.

When rotation is applied, the electrolyte level will re-establish itself roughly parallel to the spin axis (19), completely covering the fuel and oxygen electrodes (5) and (8) and with adequate liquid present to permit enhanced natural circulation flow around the fuel cell. Until the gas pressure (air, oxygen) is applied via the gas inlet pipe (9), some liquid electrolyte will flow back through the gas sparger nozzles (11) and channels (10) to an intermediate equilibrium position due to centrifugal effects. This liquid will be purged however once the applied gas over-pressure is sufficient to push the air (or oxygen) into the oxygen electrode (8) and into the 'riser' part of the circuit. The initial 'start up' air supply may be from a pressurized oxygen cylinder until enough power is generated to drive the air compressor.

The lower density two-phase mixture passing within and around the oxygen electrode (8) creates a density difference between the oxidising compartment and the fuel compartment which is the main mechanism for promoting spin-enhanced natural circulation. Air or oxygen not consumed in the oxygen electrode (8) will separate (16) from the electrolyte free surface to be discharged at the exit of the fuel cell via the outlet (17). Natural circulation flow rate is strongly governed by the local acceleration field which obviously depends on spin speed Likewise, gas-liquid separation is governed by rotation. Control of spin angular velocity therefore allows full control of the major operating parameters: pressure, flow rates, interfacial area between gas-liquid-solid (and hence chemical reaction rate and power generation), and separation efficiency.

Figure 2:
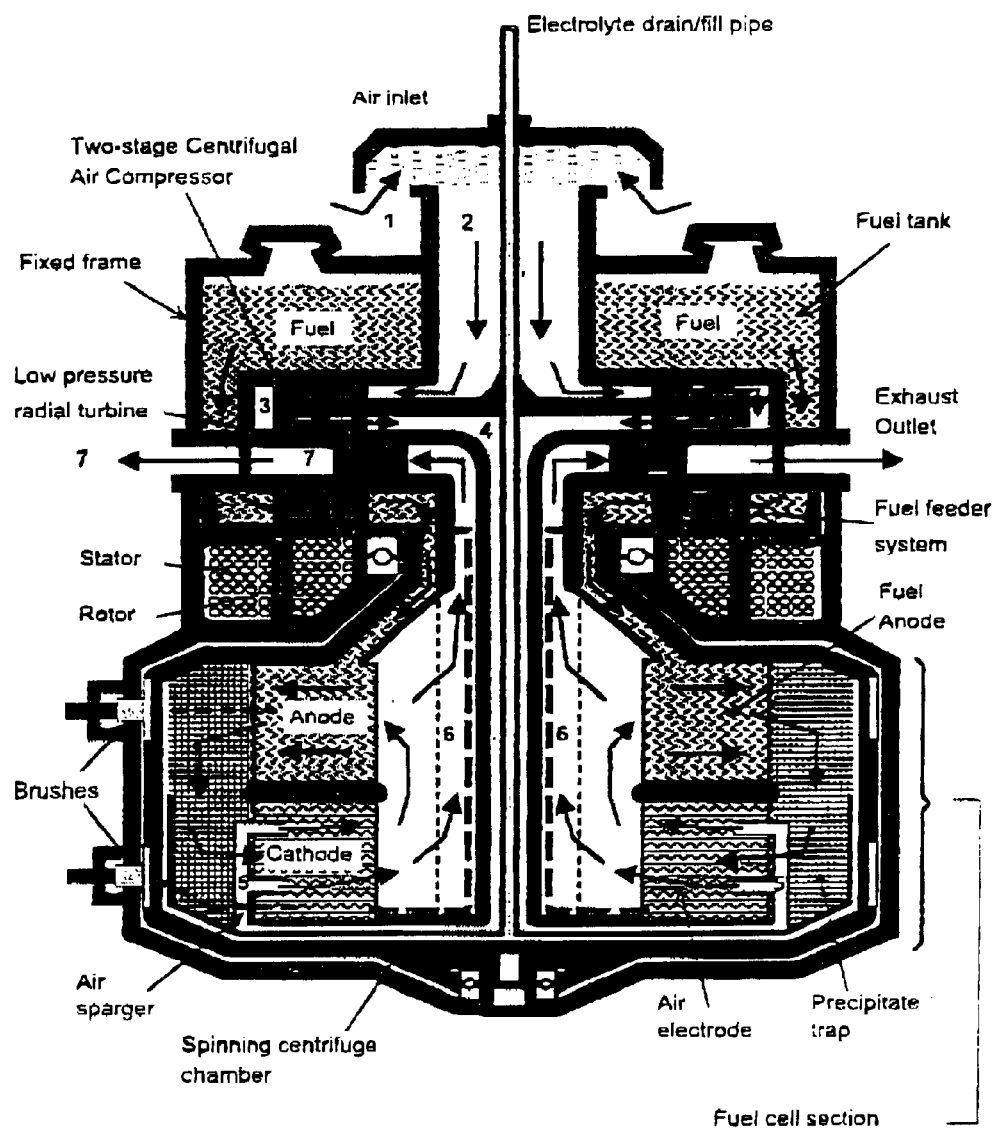
FIG. 2 is another embodiment of the basic concept as applied to rotating metal-oxygen fuel cells. This embodiment demonstrates in more detail how the fuel and oxidant may be introduced into the fuel cell.

Inter-cell electrical connections (20) and (21) are provided which may be internal or external. By providing cross-linking of an oxygen electrode (8) with a neighbouring fuel electrode (5), it is possible to connect all the individual cell segments (22) in series to increase the net output potential of the composite fuel cell configuration. Combinations of series and/or parallel interconnections between cells and with additional in-line centrifuge chambers on the same axis provides a wide range of design possibilities for different power output specifications and geometrical size envelopes. With reference to FIG. 2, the metal-oxygen fuel cell already described with reference to FIG. 1 is shown together with extra detail of the means by which the fuel and oxidant are supplied to the fuel cell and the means by which exhaust gases are depressurised. The metal-oxygen fuel cell already described with reference to FIG. 1 is shown located at the bottom. The detail of the means by which the fuel and oxidant are supplied to the fuel cell and the means by which exhaust gases are depressurised are shown located at the top. Air enters the inlet (1), is compressed from slightly sub-atmostpheric pressure (2) by means of a two-stage centrifugal compressor (3) to a central air supply line (4). From this high pressure point, air enters the sparger (5) at a pressure high enough to overcome the hydrostatic pressure of the spinning electrolyte. Air bubbles then pass through the cathode region, expanding to leave the free surface (6) at an intermediate pressure of about 4 bar. The free surface of the electrolyte is thereby kept at a pressure high enough to control boiling, Unused air then flows to the exterior of the fuel cell via an exhaust duct, first passing through a low-pressure turbine (7) where part of the compression work can be recovered, thus improving the overall efficiency of the process.

What is claimed is:

1. A fuel cell comprising:
   a chamber suitable for holding an electrolyte therein;
   a mechanism which enables rotation of the electrolyte about an axis of rotation of the chamber;
   one or more structures which define one or more inlets for introducing an oxidant and/or a fuel into the electrolyte when said electrolyte is rotating within the chamber, which one or more inlets are spaced from the axis of rotation of the chamber; at least one electrode contactable with the electrolyte and the oxidant; and
   at least another electrode contactable with the electrolyte and the fuel.

2. A fuel cell as claimed in claim 1 wherein said mechanism which enables rotation of the electrolyte also enables rotation of the chamber.

3. A fuel cell as claimed in claim 1 wherein the mechanism comprises an electric motor.

4. A fuel cell as claimed in claim 2 which comprises guide vanes or baffles on the outer surface of said chamber, which chamber is thus rotatable upon introduction of said fuel and/or oxidant.

5. A fuel cell as claimed in claim 2 wherein said mechanism which enables rotation of the electrolyte comprises a rotatable impeller or baffle provided within said chamber.

6. A fuel cell as claimed in claim 1 wherein said chamber is defined by peripheral walls at the point in the chamber which is further from said axis of rotation and wherein said inlets are provided in said peripheral walls.

7. A fuel cell as claimed in claim 1 wherein said inlet comprises sparging means.

8. A fuel cell as claimed in claim 1 which further provides one or more structures defining one or more outlets for the removal of said oxidant and/or said fuel adjacent said axis of rotation.

9. A fuel cell as claimed in claim 1 which further provides at least one trap for the collection and/or removal of electrochemical reaction by-products.

10. A fuel cell as claimed in claim 1 additionally comprising one or more compressors which pressurize the oxidant and/or fuel prior to introduction into the chamber.

11. A fuel cell as claimed in claim 1 additionally comprising one or more low-pressure turbines which depressurises oxidant and/or fuel after said oxidant and/or fuel leaves the chamber.

12. A fuel cell as claimed in claim 1 additionally comprising a feedback mechanism which regulates the flow of oxidant and/or fuel through the fuel cell so as to minimise undesirable vibrations which may occur due to non-uniform distribution of oxidant and/or fuel.

13. A fuel cell as claimed in claim 1 wherein said electrodes comprise porous electrically conductive material.

14. A fuel cell as claimed in claim 1 wherein said electrode contactable with said oxidant comprises porous electrically conductive sodium-tungsten-bronze or porous electrically conductive carbon.

15. A fuel cell as claimed in claim 1 wherein the fuel is a metal and the oxidant is oxygen or air.

16. A fuel cell as claimed in claim 15 wherein the metal fuel is provided in the form of a powder or a porous block.

17. A fuel cell as claimed in claim 15 wherein the metal is selected from one or more of aluminium, magnesium and zinc.

18. A fuel cell as claimed in claim 15 wherein said chamber additionally comprises a porous cage for containing said metal.

19. A fuel cell as claimed in claim 1 wherein said electrolyte comprises hydroxide ions.

20. A fuel cell as claimed in claim 1 wherein said electrolyte comprises an aqueous solution of potassium or sodium hydroxide.

21. A fuel cell as claimed in claim 1 wherein said chamber comprises internal baffles which define passageways for the internal recirculation of said electrolyte.

22. A fuel cell as claimed in claim 1 wherein said chamber is subdivided into smaller chambers to create a plurality of electrochemical cells which are electrically connectable to each other either in series or in parallel.

23. A fuel cell as claimed in claim 1 wherein the mechanism which enables rotation of the electrolyte enables the speed of rotation to be varied.

24. A fuel cell as claimed in claim 1 wherein the electrolyte is rotatable with the said electrolyte spin axis orientated in a vertical direction.

25. A fuel cell as claimed in claim 3 wherein the electric motor is startable by electrical energy provided by the fuel cell.

26. A fuel cell system comprising a plurality of fuel cells as claimed in claim 1 which fuel cells are physically connected in series with one another and electrically connected in series or in parallel with one another.

27. A fuel cell system as claimed in claim 26 wherein the fuel cells are mounted on a common spin axis.

28. A vehicle comprising a fuel cell as claimed in claim 1.

29. A method for operating a fuel cell, which method comprises introducing an oxidant and/or fuel into contact with an electrolyte present in a fuel cell as claimed in claim 1 by means of the one or more inlets spaced from the axis of rotation of the chamber and rotating the electrolyte about an axis of rotation of the chamber.

30. A method according to claim 29 wherein the electrolyte in the chamber is rotated by rotating the chamber.

31. A method according to claim 29 wherein the chamber is rotated by an electric motor.

32. A method according to claim 29 additionally comprising the step of regenerating the fuel and oxidant from the reaction by-products.

* * * * *